April 25, 1961 H. R. BRAND ET AL 2,981,669
REACTOR FUEL PLATE ASSEMBLY AND METHOD
Filed Oct. 22, 1958
2 Sheets-Sheet 2
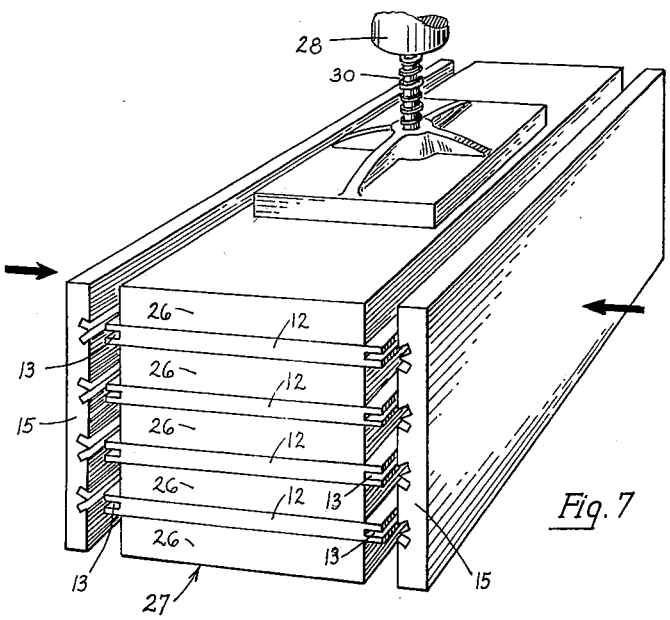
Fig. 7
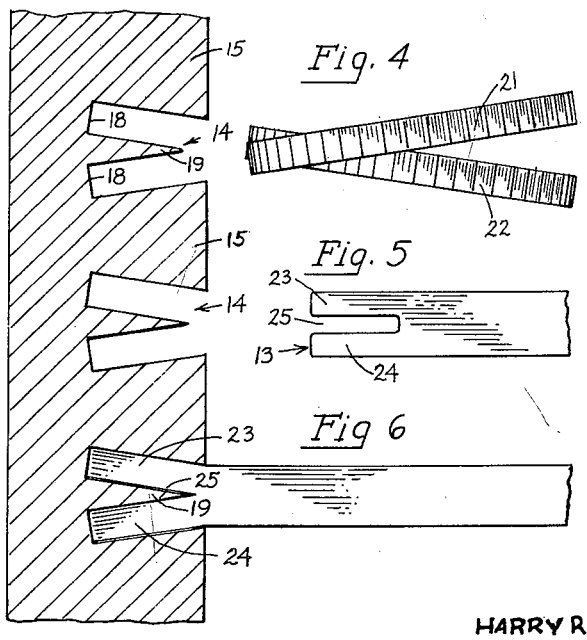
Fig. 4
Fig. 5
Fig. 6
INVENTOR.
HARRY R. BRAND
ELI ISCHEFER
BY
*Kenyon & Kenyon*
ATTORNEYS

United States Patent Office 2,981,669
Patented Apr. 25, 1961

2,981,669

REACTOR FUEL PLATE ASSEMBLY AND METHOD

Harry R. Brand, Hicksville, and Eli I. Schefer, Plainview, N.Y., assignors to Sylvania-Corning Nuclear Corporation, a corporation of Delaware Filed Oct. 22, 1958, Ser. No. 769,009

3 Claims. (Cl. 204—154.2)

This invention relates to a neutronic reactor fuel assembly and more particularly to a new assembly of fissionable fuel plates and supporting members, and the method of manufacturing such an assembly.

Reactor assemblies of the plate type normally consist of a plurality of flat, elongated, generally rectangular fuel plates disposed in a spaced overlying relationship relative to one another. Such fuel plates contain a layer of fissionable material surrounded by a layer of non-corrosive material such as aluminum. The fuel plates are held in spaced relationship by supporting members at opposed edges of the plates. Fuel assemblies, consisting of a plurality of plates and supporting members, are manufactured as units which are mounted in groups within a reactor.

There is need for a satisfactory solution to the problem of joining the fuel plates with their supporting members. At the present time, one method of assembling the components is by brazing. The disadvantages of the brazing method are that (1) it is time-consuming and costly; (2) it is difficult to maintain necessary close tolerances in assembly; (3) the brazing anneals the fuel plates and sometimes causes them to buckle and warp; (4) unrelieved stresses are set up by the heating operation; (5) the brazing flux introduces undesirable elements which often act as moderators and thus dampen the reaction capabilities of the fuel assembly; (6) and last, the fuel plates, which are expensive, often cannot be salvaged after brazing and thus cannot be recovered from assemblies which are rejected for various imperfections during manufacture or subsequent use. It is, therefore, a primary object of the present invention to provide an assembly of fuel plates and supporting members where these components are mechanically locked together.

Another object is to provide such an assembly in which there are no voids in the mechanical interlock between the plates and the supporting members.

A further object is to provide such an assembly wherein no moderating elements are introduced, and in which the fuel plates may be readily salvaged for re-use.

A further object is to provide a method of producing such an assembly which is simple and in which all the fuel plates are assembled to at least one of the supporting members in a single operation.

Briefly, the present invention consists in mechanically forming the assembly by providing a plurality of tapered channels longitudinally along one side of each of the supporting members of a fuel assembly. Each channel is tapered, or, more explicitly, it has a V-shape, when viewed in cross-section and the wide end of the V extends inwardly of said member. The innermost wall of the channel thus provides a wedge-shaped member extending outwardly from its face. A pair of opposed edges of the fuel plates are bifurcated or split longitudinally for a depth roughly equal to the depth of the channel in the supporting member.

The assembly is simplicity itself. A number of fuel plates are stacked vertically with their slit edges in registration. Each of the plates is separated by a nylon or oak spacer of appropriate dimensions so that the split edges of the plate jut beyond the spacers and the plates are separated by a vertical distance equal to the separation distance between the channels on the supporting member. The stack of plates so spaced is then clamped together and supporting members are forced in on the opposed split edges of the stack of plates. The split edge of each plate, upon entering a channel, encounters the wedge therein and is spread around the wedge so that the first portion of the split edge goes over the wedge and the second portion of the split edge goes under it. Under pressure the edges continue to deform into conforming relationship with the sides of the tapered channel, filling any voids. Upon such deformation the assembly is permanently mechanically locked together. The contiguous areas of the plates and supporting members have jammed, galled and wedged themselves together.

The V-shaped tapered channels in the supporting elements are provided by machining and rolling, or just machining on conventional equipment. Splitting of the plates is performed by a sawing operation. Removal and salvaging of a fuel plate from the assembly can be accomplished by machining away from the supporting member all or almost all of the material left behind the channels, whereupon the supporting member either falls away or can be bent away from the fuel plate and the fuel plate removed. The spread edges of the fuel plate can be returned to original condition by rolling and the fuel plate is then in condition to be reused.

The advantages of this invention are that the entire assembly is mechanically interlocked and has great internal strength due to the non-use of any process requiring heat. In assembly there are no voids between the plates and the supporting elements and this helps to minimize crevass corrosion. There are no moderating metals or substances present. Assembly, and disassembly, are facilitated.

Other objects and advantages will become apparent from the following description taken in conjunction with the accompanying drawings, in which:

Fig. 4 is the same view showing a modified channel, a method of making it.

Fig. 5 is a cross-sectional view of a supporting element and fuel plate in juxtaposition;

Fig. 6 is the same view showing the fuel plate and supporting member assembled; and Fig. 7 is a perspective view showing one method of assembling a plurality of fuel plates between two supporting members.

Figure 1:
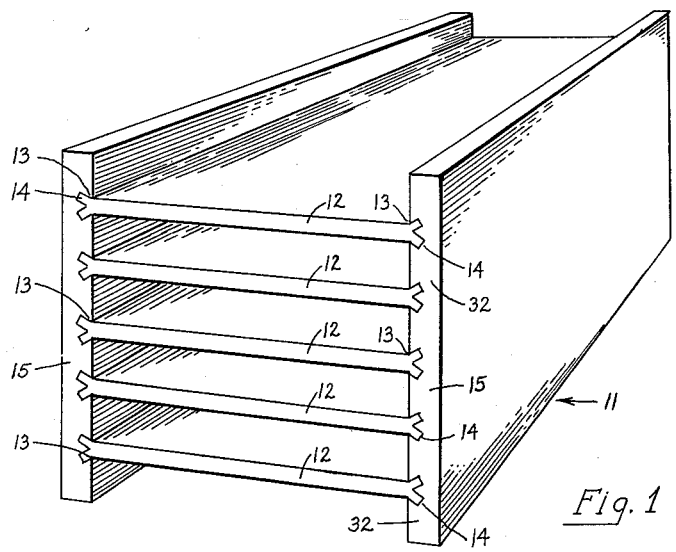
Fig. 1 is a perspective view of a reactor fuel assembly embodying the principles of the present invention.

Referring now to Fig. 1, there is shown a reactor fuel assembly 11 embodying the principles of the present invention, comprised of a plurality of fuel plates 12, disposed in spaced overlying relationship and lying generally parallel to each other. A pair of opposed edges 13, 13 of each fuel plate 12, are supported in interlocking relationship in a pair of channels 14, 14, each such channel being formed in a supporting member 15, 15. As can be seen from a close inspection of the drawing, each of the opposed edges 13 of each plate has been longitudinally slit, bifurcated and integrally locked in the channel 14 of complementary shape formed in the facing sides of the supporting members 15. Each supporting member 15 is provided with the requisite number of such channels to accommodate the required number of fuel plates.

Figure 2:
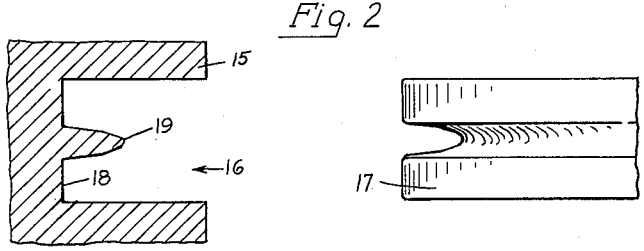
Fig. 2 is an enlarged cross-sectional view of a portion of a supporting element showing the first step in the forming of a channel.

The channels may be provided in the supporting members by machining, rolling, or other means. Referring now to Fig. 2, there is shown in cross-section a portion of a supporting member 15 with a groove 16 milled therein by a circular cutter 17. The groove 16 is cut overwide since its width is to be reduced by a subsequent rolling operation. Because of the relieved shape of a portion of the face of the cutter, the innermost face 18 of the groove 16 provides a wedge 19 facing outwardly of member 15. The above operation represents the first step in forming a tapered channel of V-shape.

Figure 3:
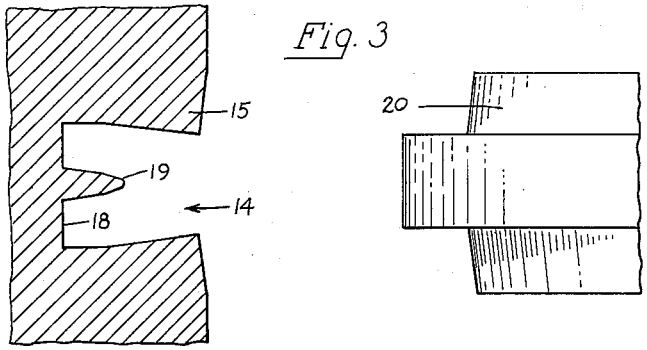
Fig. 3 is the same view showing the second step in the forming of the channel.

In Fig. 3, the same milled groove 16 of element 15, as shown in Fig. 2, has now been subjected to the operation of a forming roll 20, which has deformed, narrowed and tapered the metal edges of the groove so as to produce the narrower tapered channel as shown at 14 having a V-shape in cross-section, the wide end of said V extending inwardly of said member while retaining upon the innermost face 18 of the channel, the wedge 19 which faces outwardly of the supporting member 15. Thus the channel 14 obtains its desired final shape.

Fig. 4 shows an alternate method of providing a channel in the supporting member. The supporting member 15 is subjected to the cutting action of two rotary cutters, 21 and 22, of rectangular cross-section, mounted on independent driving shafts. The two cutters can be operated simultaneously from the same machine, one behind the other, as they cut through the side wall of the member 15. Alternately two passes can be made with the same cutter, which would successively occupy the positions shown at 21 and 22 of Fig. 4, the angle between the axis of the cutting tool being shifted so that on one pass the cutter cuts a channel extending at an angle above the horizontal as viewed in Fig. 4 and on the next pass cuts a channel extending at an angle below the horizontal so as to produce the tapered channel shown at 14 in Fig. 4. This channel also has a V-shape in cross-section, the wide end of said V extending inwardly of said member 15. The innermost face 18 of the channel has a wedge 19 facing outwardly.

To complete a supporting member, a plurality of such channels are generally formed in a side of the member. Such channels are generally aligned parallel to each other and at an appropriate distance from each other to mate with the spaced fuel plates.

As shown in Fig. 5, a fuel plate 12 has had an edge 13 split longitudinally. The split edge is formed by a longitudinal sawing operation which divides the edge 13 into a first portion or lip 23 and a second portion or lip 24 about slit 25. Also in Fig. 5, the supporting member 15 is shown in cross-section having a channel 14 therein, of the embodiment described in reference to Figs. 2 and 3 above, shown in juxtaposition to the split edge of the fuel plate. As can be seen, the wedge 19 of the channel is directly opposite the slit 25 at the edge of the fuel plate. To assemble the two in interlocking mechanical arrangement the fuel plate is forced laterally into the channel.

As shown in Fig. 6, the wedge 19 of the channel spreads the slit 25 of the fuel plate and deforms the first and second portions 23 and 24 of the fuel plate into spreading engagement with the interior sides of the tapered channel 14. As can be seen in Fig. 6, under pressure and in contact with the interior surfaces of the channel, the split edge of the fuel plates becomes bifurcated, that is, it takes on a V-shape in cross-section, the wide end of the V extending outwardly of the plates. Continued pressure fills the voids between the contiguous surfaces of the fuel plate and the channel of the supporting member and causes the contacting surfaces to jam and bind with one another.

The method of joining a fuel plate to the channel embodiment shown in Fig. 4 is the same as that just described.

The method of forming a complete reactor fuel assembly from a plurality of fuel plates and two supporting members is shown in Fig. 7. Therein the several fuel plates 12 are spaced from each other by the required number of blocks or spacers 26 of removable material, such as nylon, wood, rubber or plastic or the like. The blocks or spacers are made of smooth material, and may be of collapsible construction so that they may be readily extricated from the completed assembly.

The fuel plates 12 are wider than the spacers or blocks 26 so that the opposed split edges 13, 13 of each plate extend beyond the edges of the blocks and are, therefore, unsupported and may be inserted into the channels and deformed. As shown, the fuel plates are stacked generally parallel to each other in overlying relationship with their split edges in registration one above the other. The stack 27 of the plates thus formed is held together by a light press or vise 30 or by other appropriate means. Two supporting members 15, 15 are disposed with their channelled sides facing and each channel in alignment with a split edge of a fuel plate. Such alignment may be accomplished by use of a jig (not shown). Either one or both supporting members 15 are then forced against the stack of fuel plates by the operation of a hydraulic ram (not shown) or other convenient means. Thereupon each split edge of the fuel plate is interlocked in its respective channel by spreading engagement with the wedge 19. The entire assembly is mechanically interlocked in one final operational step.

Using any of the above embodiments the individual fuel plates may be readily salvaged for re-use by machining or milling away all or almost all of the outer side of each of the supporting members 15 down to the channel 14, whereupon the fuel plates are removable.

Although several embodiments of the invention have been shown and described herein, it is to be understood that certain changes and additions may be made by those skilled in the art. For example, the channels of the supporting members may be simply cut without providing a wedge on their innermost surfaces. In place of such wedge, a wedge-shaped wire rod, or the like, may be placed in the slit edge of the fuel plate between the first and second portions thereof with the thin end of the wedge entering the slit in the plate. When the plate edge is forced into the channel the wire will act in precisely the same manner as a wedge integrally formed on the innermost wall of the channel. Alternately, the channel may be again formed without a wedge on its innermost face, but as the spread edge of the fuel plate is being forced into the channel, a roll having a wedge-shaped edge may be driven into the back of the fuel plate in juxtaposition to the slit in the split edge and thereby assist in deforming metal of the supporting member into spreading engagement between the first and second portions of the split edge. It should also be understood that reactor fuel assemblies of the type described may comprise only a single supporting member joined to a single fuel plate, or to a plurality of fuel plates in parallel relationship.

These and other changes and additions can be made without departing from the scope and spirit of this invention.

We claim:

1. The method of joining a plurality of fuel plates with a supporting member in a reactor fuel assembly comprising longitudinally splitting an edge of each of said plates, stacking said plates in spaced, overlying relationship with their split edges in registration with each other, spacing each of said plates from the other with a removable block, clamping said stack of plates and blocks together, forming on said supporting member a plurality of tapered channels, each having an outwardly disposed wedge surface on its innermost face, registering said channels with said split edges of said stacked plates, forcing the split edges of the stacked plates into the channels and against the wedges thereof, and spreading the split edges around the wedges and into conforming relationship with the sides of the tapered channels.

2. The method of joining a plurality of fuel plates with a supporting member in a reactor fuel assembly comprising longitudinally splitting an edge of each of said plates to provide a first and a second portion, stacking said plates in overlying relationship with their split edges in registration with each other, spacing each of said plates from the other with a removable block, clamping said stack of plates and blocks together, forming on said supporting member a plurality of tapered channels each having an outwardly disposed wedge surface on its innermost face, registering said channels with said split edges of said stacked plates, and forcing the split edges of the stacked plates into the channels, and against the wedges thereof and spreading the first and second portions of the split edges around the wedges and into conforming relationship with the sides of the tapered channels.

3. The method of joining a plurality of fuel plates with a supporting member in a reactor fuel assembly comprising longitudinally splitting an edge of each of said plates to provide a first and second portion, stacking said plates in overlying relationship with their split edges in registration with each other, spacing each of said plates from the other with a removable block, clamping said stack of plates and blocks together, forming in said supporting member a plurality of tapered channels of V-shaped cross-section, the wide end of each V extending inwardly and providing each channel with an outwardly disposed wedge on its innermost face, registering said channels with said split edges of said stacked plates, and forcing the split edges of the stacked plates into the channels, and against the wedges thereof and spreading the first and second portions of the split edges around the wedges and into conforming relationship with the sides of the tapered channels.

References Cited in the file of this patent

UNITED STATES PATENTS

| | | |
|---|---|---|
| 851,977 | Bigsby et al. | Apr. 30, 1907 |
| 958,239 | Emden et al. | May 17, 1910 |
| 2,327,259 | Gay | Aug. 17, 1943 |
| 2,525,092 | Bruegger | Oct. 10, 1950 |
| 2,831,806 | Wigner | Apr. 22, 1958 |